US010158124B2

(12) United States Patent
Maruyama et al.

(10) Patent No.: US 10,158,124 B2
(45) Date of Patent: Dec. 18, 2018

(54) FUEL CELL ELECTRODE CATALYST AND METHOD FOR ACTIVATING CATALYST

(71) Applicant: W. L. GORE & ASSOCIATES, CO., LTD., Tokyo (JP)

(72) Inventors: Masashi Maruyama, Tokyo (JP); Tomoyuki Kawaguchi, Tokyo (JP); Atsushi Sakamoto, Tokyo (JP)

(73) Assignee: W.L. Gore & Associates, Co., Ltd., Tokyo (JP)

( * ) Notice: Subject to any disclaimer, the term of this patent is extended or adjusted under 35 U.S.C. 154(b) by 242 days.

(21) Appl. No.: 14/889,555

(22) PCT Filed: May 9, 2014

(86) PCT No.: PCT/JP2014/062510
§ 371 (c)(1),
(2) Date: Nov. 6, 2015

(87) PCT Pub. No.: WO2014/181873
PCT Pub. Date: Nov. 13, 2014

(65) Prior Publication Data
US 2016/0126560 A1 May 5, 2016

(30) Foreign Application Priority Data

May 10, 2013 (JP) ................................ 2013-100602

(51) Int. Cl.
*H01M 4/86* (2006.01)
*H01M 4/88* (2006.01)
(Continued)

(52) U.S. Cl.
CPC ........... *H01M 4/8657* (2013.01); *H01M 4/88* (2013.01); *H01M 4/9041* (2013.01); *H01M 4/92* (2013.01);
(Continued)

(58) Field of Classification Search
CPC .... H01M 4/8657; H01M 4/88; H01M 4/9041; H01M 4/92; H01M 4/921; H01M 8/1018
See application file for complete search history.

(56) References Cited

U.S. PATENT DOCUMENTS

2005/0075240 A1 4/2005 Yamamoto
2006/0042957 A1 3/2006 He
(Continued)

FOREIGN PATENT DOCUMENTS

CN 103041823 A 4/2013
GB 0184473 * 2/1924
(Continued)

OTHER PUBLICATIONS

Database WPI, Week 201406, Thomson Scientific, Lond, GB; XP-002762778.
(Continued)

*Primary Examiner* — Helen Oi K Conley
(74) *Attorney, Agent, or Firm* — Greenberg Traurig LLP

(57) ABSTRACT

The present invention addresses the problem of providing: a core-shell catalyst capable of achieving, when evaluated for a fuel cell, the catalytic activity anticipated from the catalyst activity value obtained using a rotating disc electrode (RDE); and a method for activating a core-shell catalyst in said manner. The present invention relates to a fuel cell catalyst, which is an electrode catalyst having a core-shell structure and is characterized in that at least 99% of the core member is covered by the shell member and the halogen content is not more than 5000 ppm. The present invention also relates to a method for activating said core-shell catalyst, the method comprising: a process for dispersing the core-shell catalyst in a dispersion solvent; a process for separating impurities from said core-shell catalyst by blowing a gas that has reducing properties or a mixed gas
(Continued)

comprising same into said dispersion solvent; and a process for removing said impurities.

13 Claims, 2 Drawing Sheets

(51) Int. Cl.
    *H01M 4/92*     (2006.01)
    *H01M 4/90*     (2006.01)
    *H01M 8/1018*     (2016.01)

(52) U.S. Cl.
    CPC ......... *H01M 4/921* (2013.01); *H01M 8/1018* (2013.01); *H01M 2008/1095* (2013.01)

(56) References Cited

U.S. PATENT DOCUMENTS

| | | |
|---|---|---|
| 2010/0048387 A1 | 2/2010 | Zhang et al. |
| 2012/0183869 A1 | 7/2012 | Jin et al. |
| 2012/0245019 A1 | 9/2012 | Adzic et al. |
| 2016/0049664 A1 | 2/2016 | Kaneko et al. |

FOREIGN PATENT DOCUMENTS

| | | |
|---|---|---|
| JP | 2005-100713 A | 4/2005 |
| JP | 2005135900 A | 5/2005 |
| JP | 2007134295 A | 5/2007 |
| JP | 2010-214330 A | 9/2010 |
| JP | 2011-89143 A | 5/2011 |
| JP | 2011-235215 A | 11/2011 |
| JP | 2012-120949 A | 6/2012 |
| JP | 2012-143753 A | 8/2012 |
| JP | 2012-192334 A | 10/2012 |
| WO | WO-2011/145225 A1 | 11/2011 |
| WO | 2012/105978 A1 | 8/2012 |
| WO | WO-2014/073114 A1 | 5/2014 |

OTHER PUBLICATIONS

English translation of International Search Report corresponding to PCT/JP2014/062510 dated Aug. 12, 2014, 4 pages.

Xiong Bo-qingiqing, Progress in nonferrous metals (1996-2005) vol. 7 New nonferrous metal materials, pp. 350-351 (Nov. 30, 2007).

Office Action issued for Chinese Application No. 201480026192.1 dated Dec. 13, 2017 along with an English translation.

* cited by examiner

FUEL CELL ELECTRODE CATALYST AND METHOD FOR ACTIVATING CATALYST

The present application is a U.S. national-stage entry of International Pat. Appl. No. PCT/JP2014/062510, filed on May 9, 2014, and claims priority to Japanese Pat. Appl. No. 2013-100602, filed on May 10, 2013, which applications are incorporated herein by reference in their entirety.

TECHNICAL FIELD

The present invention relates to catalysts, in particular fuel cell catalysts, in particular a cathode-side catalyst for a polymer electrolyte fuel cell, and also relates to a method for activating a catalyst.

BACKGROUND ART

A polymer electrolyte fuel cell has a basic structure arranging a cation-exchange membrane which allows protons to be selectively permeated, catalyst layers which are joined to both sides thereof, and further gas diffusion layers such as carbon paper on their external sides. The above-described catalyst layer mainly includes an anode on which a reaction occurs with hydrogen as an active material and a cathode on which a reaction occurs with oxygen as an active material. When hydrogen and oxygen as the active materials are supplied. to the respective catalyst layers, the reaction of $H_2 \rightarrow 2H^+ + 2e^-$ ($E_0 = 0$ V) occurs on an anode catalyst while the reaction of $O_2 + 4H^+ + 4e^- \rightarrow 2H_2O$ ($E_0 = 1.23$ V) occurs on a cathode catalyst, and electricity is generated by a resulting potential difference. For efficient electricity generation, a gas migration pathway for supplying a reactant gas which is an active material to the catalyst in the catalyst layer are necessary; a proton-conducting pathway through which protons and electrons generated by the anode are transported to The cathode; and an electron transfer pathway. In general, the catalyst layer is constituted by catalytic metal-supported carbon particles having electrical conductivity and a polymer electrolyte material to satisfy the above-described properties. Gaps between the catalyst particles and the pores of the catalyst particles play the role of the gas migration pathway, and the electron-conducting pathway is formed by contact of the catalyst support particles.

Carbon particles which support a catalytic metal such as platinum or platinum alloy and have electrical conductivity are generally used in an electrode catalyst. Since the catalytic metal such as platinum used in the electrode catalyst is a very expensive material, development of a fuel cell that exhibits excellent electricity generation performance in a small amount of platinum used is crucial for proceeding with practical use of a fuel cell.

In recent years, it has been said that reduction in cost is a crucial condition in the practical use of a fuel cell, and a catalytic metal such as platinum used in an electrode catalyst makes up a very large proportion of the cost.

As a method for improving the utilization rate of a catalytic metal, for example, platinum has been made to be fine particles to increase an exposed surface area. By decreasing the particle diameters of the catalytic metal particles, the utilization rate of the catalytic metal can be raised, since the exposed surface area of the catalytic metal is increased even when the amount of the catalytic metal used is the same. However, it is difficult to disperse the catalytic metal such as platinum or platinum alloy as fine particles on a carbon surface, the particles very easily agglomerate even when the particles can be made fine, and, therefore, the catalyst particles are easily enlarged by driving a fuel cell. Therefore, regarding particle diameter of a platinum particle supported on a carbon particle, in general, platinum having the particle diameter of typically around 3 nm is often supported.

As a fuel cell electrode catalyst, there has been proposed an electrode catalyst characterized in that it includes a core-shell structure with a core unit including a noble or transition metal and a shell unit including a noble metal-containing layer which is formed on the periphery thereof and of which the composition is different from that of the core unit. In a core-shell-type catalytic metal fine particle, since a highly active catalytic metal can be disposed only on the surface (shell) thereof, the exposed surface area per unit weight of the highly active catalytic metal is large. Therefore, the electrode catalyst having the core-shell structure is excellent in the utilization rate of a catalytic metal contributing to the activation of an electrode reaction and enables the amount of the catalytic metal used to be reduced.

For the production of the core-shell catalyst, synthesis can be performed by electrochemical production methods as exhibited in Patent Literature 1 described below and the like. When the techniques are used, a material having an ideal core-shell structure with the high coating degree of a shell can be produced.

CITATION LIST

Patent Literature

Patent Literature 1
U.S. Pat. Pub. No. 2012/0245019 A1

SUMMARY OF INVENTION

Problem to be solved by the invention

However, in the catalyst having the core-shell-type structure produced by the methods disclosed in the literatures, although a very high property value was obtained in catalytic activity evaluated using RDE (rotating disk electrode), catalytic activity expected from the catalytic activity value obtained by RDE was not obtained to make the catalyst which was not excellent in cell property when the catalyst was evaluated as a fuel cell.

The core-shell catalyst has the problem that an expected cell property is not obtained when the catalyst is evaluated as a fuel cell. In other words, the problems to be solved by the present invention are: to provide a core shell catalyst in which catalytic activity expected from a catalytic activity value obtained by RDE can also be realized when the catalyst is evaluated as a fuel cell; and to provide a method for activating a core shell catalyst so. The present invention is explained entirely in relation to a fuel cell catalyst, but is not limited thereto, and also relates to catalysts used in a wide range of common applications.

Solution to Problem

As a result of paying attention to a process for producing a fuel cell to conduct extensive examination, the present inventor found that expected cell properties can be obtained and there is the great influence of an impurity content as one of the causes of having prevented the expected cell properties from being obtained. The following embodiments are provided by the present invention accomplished based on the findings.

(1) A catalyst including a core shell structure, wherein 99% or more of a core member is coated with a shell member with a highly active material; and a halogen content is 5000 ppm or less.

(2) The catalyst according to (1), wherein the catalyst is a fuel cell catalyst.

(3) The catalyst according to (1) or (2), produced by an electrochemical technique.

(4) The catalyst according to any one of (1) to (3), wherein the halogen content is reduced to 5000 ppm or less by post-treatment.

(5) A method for activating a core shell catalyst, including the steps of:

dispersing the core shell catalyst in a dispersion solvent;

blowing a gas with a reducing ability or a mixture gas containing the gas into the dispersion solvent to separate impurities from the core shell catalyst; and removing the impurities.

(6) The method according to (5), wherein the core shell catalyst is a fuel cell catalyst.

(7) The method according to (5) or (6), wherein the dispersion solvent is water.

(8) The method according to any one of (5) to (7), wherein the gas with the reducing ability is hydrogen and/or alcohol.

(9) The method according to any one of (5) to (8), wherein the dispersion solvent is stirred at a temperature of 70° C. or more during the blowing.

(10) The method according to any one of (5) to (9), wherein the step of removing the impurities is finished within one our after finishing the step of separating the impurities.

(11) The method according to any one of (5) to (10), wherein supernatant liquid containing the impurities is separated from the core shell catalyst by decantation to remove the supernatant liquid in the step of removing the impurities.

(12) The method according to any one of (5) to (11), wherein the core shell catalyst includes at least one of platinum, cobalt, iron, nickel, ruthenium, iridium, and gold in a shell unit.

Advantageous Effects of Invention

According to the present invention, there are provided: a core shell catalyst in which catalytic activity expected from a catalytic activity value obtained by RDE can also be realized when the catalyst is evaluated as a fuel cell; and a method for activating a core shell catalyst so.

Specifically, it was confirmed that, when the core shell catalyst of the present invention is disposed on an oxygen electrode side and is evaluated as a fuel cell, the core shell catalyst has equivalent cell properties, even when the amount of the catalyst used is reduced to ¼, in comparison with the case of using a conventional electrode catalyst (catalyst having no core shell structure). In other words, the amount of a used catalyst such as platinum, which has been a major problem in putting a fuel cell into practical use, can be greatly reduced by the present invention.

The catalyst according, to the present invention is not limited to a fuel cell catalyst. Even when the catalyst according to the present invention is utilized as a catalyst of a common application, catalytic activity confirmed at a laboratory level can also be realized in practical use. Further, there is provided a method for activating, a catalyst used in a common application as such.

DESCRIPTION OF EMBODIMENTS

Figure 1:
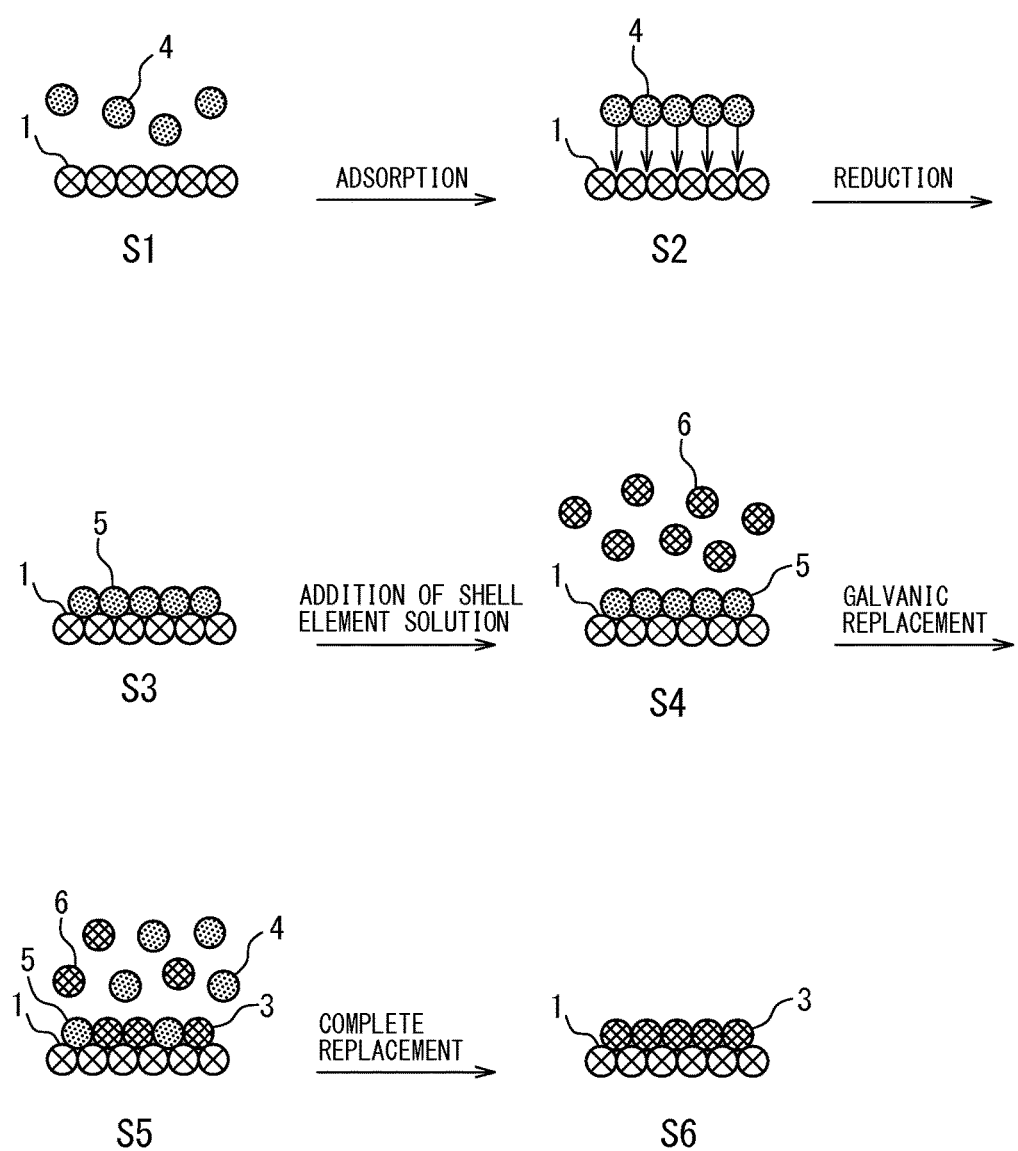
FIG. 1 is a view explaining an underpotential deposition method (UPD method).

According to the present invention, there is provided a catalyst, in particular a fuel cell catalyst, including a core shell structure, wherein. 99% or more of a core member is coated with a shell member; and a halogen content is 5000 ppm or less.

The catalyst according, to the present invention, which is a catalyst used in a common application, is not limited to fuel cell catalysts. Specifically, applications of the catalyst according to the present invention are automobile exhaust gas purification catalysts, petroleum refining catalysts, desulfurization catalysts, denitrification catalysts, synthesis gas production catalysts, hydrogen production catalysts, alcohol synthesis catalysts, coal liquefaction catalysts, coal gasification catalysts, biomass resource conversion catalysts, organic chemical catalysts, inorganic chemical catalysts, fine chemical catalysts, and the like. In particular, in the case of a fuel cell, catalyst, the catalyst can be used as an electrode catalyst, a desulfurization catalyst, a fuel reforming catalyst, a CO modification catalyst, a CO removal catalyst, or the like.

In the core shell catalyst, a highly active material (e.g., platinum) remains only on the surface (shell) of a catalyst particle and the inside (nucleus, core) of the particle which does not directly contribute to catalytic action is replaced with a different material. In the core shell catalyst, the used amount of a highly active material such as platinum, which is very expensive and rare, is minimized as little as possible, while fine particles equivalent to a conventional platinum catalyst can be further formed and catalytic activity equivalent to or better than that of the conventional platinum catalyst can be expected.

An element that constitutes the shell is at least one noble metal selected from the group consisting of platinum, cobalt, iron, nickel, ruthenium, iridium and gold, and is particularly preferably platinum. As the element that constitutes the shell, one or more of the above-described metals or an alloy of two or more thereof may be used.

An element that constitutes the core is at least one noble metal selected from the group consisting of palladium, gold, iridium, nickel, iron, cobalt and ruthenium, and particularly preferably palladium. As the element that constitutes the core, one or more of the above-described metals or an alloy of two or more thereof may be used.

A support, on which the core shell catalyst is supported, is required to have sufficient electrical conductivity and sufficient permeability of fuel or the like when being used in a fuel cell. Therefore, a porous carbon material, e.g., carbon black, activated carbon, or the like may be used.

As a method for producing the core shell catalyst, without particular limitation, a chemical technique such as a liquid phase reduction method or an electrochemical technique such as an underpotential deposition method (UPD method) may be used.

In the liquid phase reduction method, a salt containing an element, that constitutes the shell is added to a solution in which a support on which a core particle is supported is suspended. An ion of the element that constitutes the shell in the solution is reduced using a reducing agent such as hydrogen or sodium borohydride, the shell-constituting element is deposited on a core particle, and the core shell catalyst can be obtained.

The underpotential deposition method (UPD method) is carried out by a procedure as depicted in FIG. 1. An electrochemical cell for preparing a catalyst is prepared and an element that constitutes the shell is used in a counter electrode. A solution containing a base metal ion (4) at an appropriate concentration is prepared in the cell to dip a support, on which a core particle (1) is supported, into the solution (S1). The core particle (1) is brought into contact with a cell body electrode (CBE) to obtain a charge needed for UPD and to effect adsorption of the base metal ion (4) on the surface of the core particle (1) by stirring the solution and applying an appropriate potential (S2), and a monolayer (5) of the base metal is formed (S3). Then, the base metal ion (4) remaining in the solution is removed, and the surplus base metal ion (4) on the particle surface is also removed. At this time, inert atmosphere such as nitrogen is made in order to suppress The oxidation of the monolayer (5) of the base metal. A solution containing a salt of the shell-constituting element (nobler metal) is added to the cell (S4). An ion of the shell-constituting element (6) is replaced with the monolayer (5) of the base metal by an oxidation-reduction reaction (S5). The shell-constituting element (nobler metal) (6) receives electrons from the base metal and acts as an oxidizing agent. Simultaneously, the ion of the shell-constituting element (nobler metal) is reduced. and replaced with the base metal monolayer on the surface. As a final product, a core shell catalyst having the monolayer of the shell-constituting element (nobler metal) can be obtained (S6).

In the core shell catalyst according to the present invention, 99% or more of the core member is coated with the shell member. Through a catalytic reaction or the like, the core member may dissolve and. flow out from a part that is not coated with the shell member, to disintegrate the core shell structure and to lose a function as the catalyst. A coating rate of 99% or more enables sufficient life to be secured. In general, in the chemical technique such as the liquid phase reduction method, a thick shell layer is deposited. on a core metal or a shell element is deposited in a solution, and therefore it is difficult to efficiently coat the core member with the shell member. Accordingly, the electrochemical technique such as the underpotential deposition method (UPD method) is preferable to the chemical technique such as the liquid phase reduction method because of easily providing a higher coating rate.

The coating rate of the core member with the shell member may be determined from a cyclic voltammogram for the obtained core shell catalyst. For example, the hydrogen desorption peak of the obtained voltammogram is determined. A catalyst having no core shell structure (catalyst only having a core) is also prepared to determine the peak thereof. The peaks of the core shell catalyst and de catalyst only having the core are compared, the peak decreased in the catalyst only having the core by coating with the shell is found, and the coating rate can be calculated from the degree of the decrease in the peak.

Coating Rate (%)={[(Peak Area of Catalyst Only Having Core)−(Peak Area of Core Shell Catalyst)]/(Peak Area of Catalyst Only Having Core)}×100   Expression (1)

In the core shell catalyst according to the present invention, a halogen content is 5000 ppm or less.

Catalysts having core-shell-type structures include a catalyst having poor cell properties, in which, although very high property values are obtained in catalytic activity evaluated using ROE (rotating disk electrode), catalytic activity expected from the catalytic activity values obtained by RDE is not obtained when the catalyst is evaluated as a fuel cell.

As a result of extensive examination, the present inventor found that one of the causes thereof is a halogen content. A fuel cell having excellent cell properties can be realized by a halogen content of 5000 ppm or less. A lower halogen content is preferable. For example, the halogen content is preferably 4000 ppm or less and may be further preferably 3000 ppm or less, further preferably 2000 ppm or less, further preferably 1500 ppm or less, further preferably 1000 ppm or less, further preferably 500 ppm or less. The catalyst. according to the present invention offers an advantageous effect in any reaction system that can be influenced by a halogen content.

The halogen content can be made to be 5000 ppm or less by controlling the content of impurities contained in a raw material for a catalyst. In general, in raw materials of which the impurity contents are controlled, there are many materials developed for chemical techniques such as a liquid phase reduction method. Accordingly, it is difficult to directly apply the raw materials, of which the impurity contents are controlled, to electrochemical techniques such as an underpotential deposition method (UPD method).

When the amount of impurities in a raw material cannot be controlled, a halogen content may also be adjusted to 5000 ppm or less by post-treatment after preparing a core shell catalyst. The adjustment of the halogen content by the post-treatment is very useful in the core shell catalyst by an electrochemical technique such as an underpotential deposition method (UPD method).

In general, a catalyst, in particular a fuel cell catalyst has been made by using a support, for example, carbon black etc., having minute pores and a large surface area in a catalyst support and supporting very small catalyst fine particles, and it has been therefore difficult to efficiently remove impurities contained once. Particularly, among impurities that can be contained in an electrode catalyst, an anion such as halogen has a high electronegativity, easily adheres to a catalyst and a support, and is difficult to remove. As a result of extensive examination, the present inventor accomplished a method for removing impurities from a catalyst to activate the catalyst, as explained below. The method can be used as post-treatment in which a halogen content in a catalyst is made to be 5000 ppm or less.

According to the present invention, there is provided a method for activating a core shell catalyst. The method includes the following steps:

the step of dispersing a core shell catalyst in a dispersion solvent;

the step of blowing a gas having a reducing ability or a mixture gas containing the gas into the dispersion solvent to separate impurities from the core shell catalyst; and the step of removing the impurities.

The core shell catalyst is a catalyst used in a wide range of common applications, is not limited to particular applications, and may be a fuel cell catalyst. In the case of the fuel cell catalyst, catalytic activity expected from a catalytic activity value obtained by RDE can also be realized when the catalyst is evaluated as a fuel cell.

The core shell catalyst is added to the dispersion solvent and is dispersed in the solvent. The dispersion solvent is not particularly limited as long as the dispersion solvent inhibits the core shell catalyst from decomposing or aggregating. As the dispersion solvent, water may be used.

The gas having the reducing ability or the mixture gas containing the gas is blown into the solvent in which the core shell catalyst is dispersed. Since the blown gas is the gas having the reducing ability or contains the gas, the impurities contained in the core shell catalyst, particularly halogen, can be reduced and separated from the core shell catalyst. The gas having the reducing ability may be hydrogen, alcohol, or a mixture of hydrogen and alcohol.

During the blowing, the dispersion solvent may also be stirred at a temperature of 70° C. or more. As a result, the dispersion of the core shell catalyst in the solvent and the separation of the impurities from the core shell catalyst are promoted.

In general, the reducing ability of the blown as is increased with increasing temperature. Therefore, the temperature of the solvent may be 70° C. or more and may be preferably 80° C. or more. The upper limit of the temperature may be determined depending on the property, such as vapor pressure, of the solvent. When the solvent is water, the upper limit of the temperature may be 100° C. and may be preferably 90° C.

The stirring is performed by the blowing of the gas and may also be performed by a further added mechanical device. As the mechanical stirring device, which is not particularly limited, for example, a magnetic stirrer, a homogenizer, or the like may be used.

The impurities separated from the core shell catalyst are moved to the solvent by blowing the gas with the reducing ability. The impurities in the solvent are removed. For an operation for removing the impurities, without particular limitation, decantation, centrifugation, distillation, filtration, or the like can be utilized depending on the properties of the impurities, the solvent, and the like. The impurities may also be removed by separating supernatant liquid containing the impurities from the core shell catalyst to remove the supernatant liquid by the decantation. The decantation is advantageous in view of a small mechanical or thermal influence and a small influence on the core shell catalyst in itself, in comparison with the centrifugation, the distillation, the filtration, or the like.

The step of removing the impurities may be finished within one hour after finishing the step of separating the impurities (blowing). Although the impurities are separated from the core shell catalyst and moved to the solvent by blowing the gas with the reducing ability, the impurities moved into the solvent, particularly halogen, might re-adhere to the core shell catalyst when the blowing is finished. As mentioned above, a fuel cell having excellent cell properties is not obtained when a halogen content is increased in the core shell catalyst. The re-adherence of the impurities, particularly halogen, to the core shell catalyst can be suppressed by removing the solvent containing the impurities immediately after finishing the step of separating the impurities, i.e., blowing. In this respect, the content of halogen in the core shell catalyst can be made to be 5000 ppm or less by removing the impurities within approximately 15 hours after finishing the step of separating the impurities (blowing). However, faster performance of the step of removing the impurities is preferable in view of yield per time in a process for producing a core shell catalyst, and the step of removing the impurities may be performed within one hour after finishing the step of separating the impurities. The step of removing the impurities may be performed more preferably within 50 minutes, further preferably within 40 minutes, further preferably within 30 minutes, further preferably within 20 minutes, further preferably within 10 minutes. The lower limit thereof can be determined depending on time for which the step of removing the impurities is performed.

EXAMPLES

The present invention will be more specifically explained below with reference to examples but the present invention is not limited to the examples.

Preparation of Core Shell Catalyst

Figure 2:
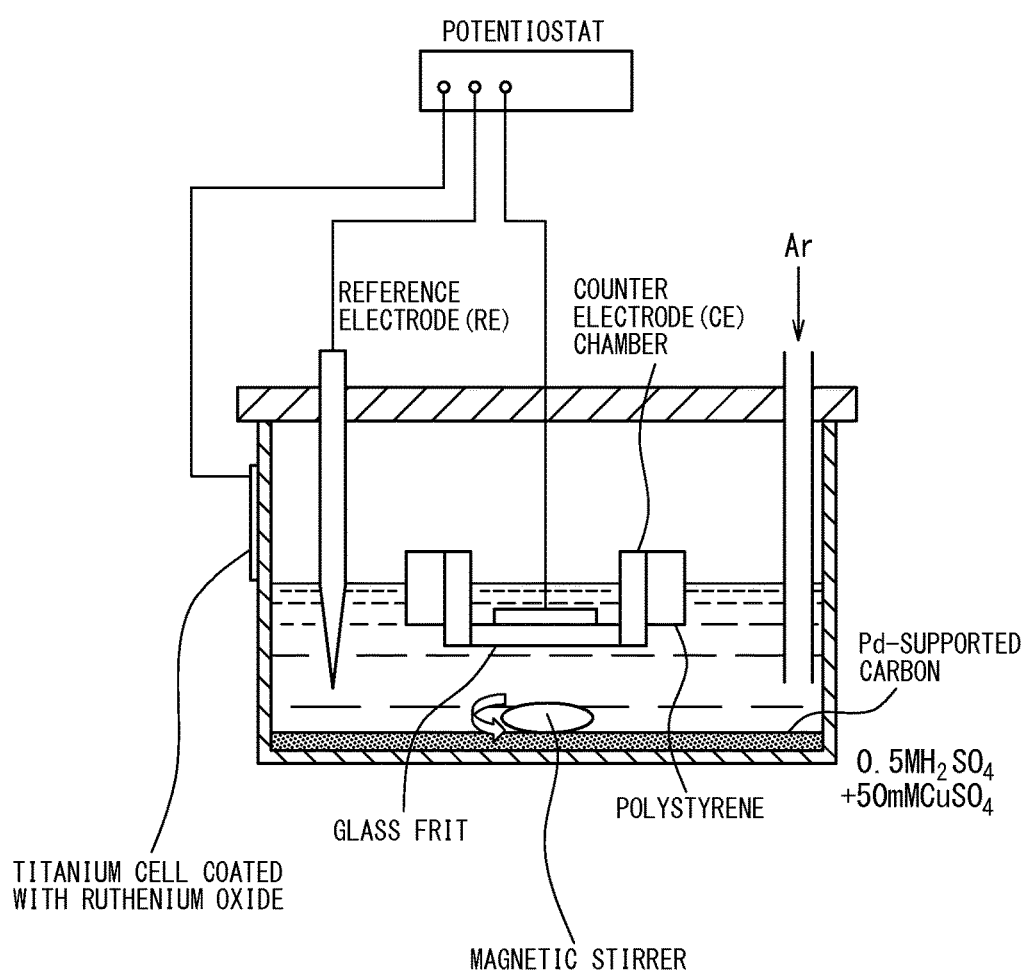
FIG. 2 is a schematic view of an electrochemical cell for preparing a core shell catalyst.

A core shell catalyst was prepared by a method according to Patent Literature 1. Using a titanium cell coated with ruthenium oxide as an electrochemical cell for preparing a catalyst, using platinized platinum in a counter electrode (CE) and a Ag/AgCl electrode as a reference electrode (RE), and using 0.5 M sulfuric acid as electrolyte liquid, the catalyst was prepared while blowing Ar (see FIG. 2). The cell and the counter electrode, which were separated by a glass frit, were used in order to avoid the direct contact of Pd-supported carbon (Pd particles forming a core unit and carbon black forming a support) with the counter electrode (platinum). All the potentials used below are indicated by potentials to a reversible hydrogen electrode (RHE). Into the preparative cell, 2 g of Pd-supported carbon was charged, and the cleaning of a Pd particle surface and the removal of an oxide film were carried out by a potential cycle, followed by adding a copper sulfate solution so that a copper (II) ion concentration was 50 mM while stirring the electrolyte liquid by a magnetic stirrer. Then, the potential was maintained to 400 mV, and the underpotential deposition of Cu on the Pd. particle surface was carried out to form a Cu monolayer on the Pd particle surface. When an electric current was stable at around zero, potassium chloroplatinate (II) was slowly added to be 50 mM while vigorously stirring the solution. Then, the Cu monolayer on the Pd particle surface was replaced with a Pt atom to form a Pt monolayer. A Pt/Pd/C catalyst was prepared by repeating the operation of filtrating resultant slurry, separating the solution from the catalyst, adding distilled water and stirring the resultant to wash the catalyst obtained as a solid, and then carrying out filtration. Cyclic voltammograms of the obtained core shell catalyst and the catalyst prior to being coated with the shell were carried out to determine a coating rate with the shell. The coating rate of each obtained core shell catalyst was 99% or more.

Example 1

Activation Treatment of Catalyst

In 200 ml of distilled water, 2 g of the prepared. Pt/Pd/C core shell catalyst was dispersed, the temperature thereof was kept at 70° C., a mixture gas of 10% of hydrogen and 90% of nitrogen was blown, and activation treatment was carried out for 7 hours while stirring with a magnetic stirrer. Then, the stirring was stopped, and supernatant liquid was separated from the catalyst to remove the supernatant liquid by decantation. To a resultant precipitate, 200 ml of distilled water was added to repeat washing by decantation. The repeated washing was carried out within one hour after finishing the activation treatment. Distilled water was added to the washed precipitate to make 200 mL of a dispersion, and activation treatment for 7 hours, decantation, and washing were further carried out by the same procedure as described above. The resultant precipitate was dried at 90° C. to obtain a catalyst A subjected to the activation treatment.

Example 2

Activation Treatment of Catalyst

In 200 mL of distilled water, 2 g of the prepared Pt/Pd/C core shell catalyst was dispersed, the temperature thereof was kept at 70° C., a mixture gas of 10% of hydrogen and 90% of nitrogen was blown, and activation treatment was carried out for 7 hours while stirring with a magnetic stirrer. Then, the stirring was stopped, and supernatant liquid was separated from the catalyst to remove the supernatant liquid by decantation. To a resultant precipitate, 200 ml of distilled water was added to repeat washing by decantation. The repeated washing was carried out within one hour after finishing the activation treatment. The resultant precipitate was dried at 90° C. to obtain a catalyst B subjected to the activation treatment.

Example 3

Activation Treatment of Catalyst

A catalyst C was prepared by the same procedure as in Example 2 except that activation treatment time was 3 hours.

Example 4

Activation Treatment of Catalyst

A catalyst D was prepared by the same procedure as in Example 2 except chat activation treatment time was 1.5 hours.

Example 5

Activation Treatment of Catalyst

A catalyst E was prepared by the same procedure as in Example 2 except chat activation treatment time was 30 minutes.

Comparative Example 1

Evaluation was carried out using a Pt/Pd/C core shell catalyst that is not subjected so activation treatment, as a target for comparison.

Comparative Example 2

Evaluation was carried out using a commercially available Pt-supported carbon catalyst NEF-50, manufactured by N.E. CHEMCAT Corporation, as a target for comparison.

Measurement of Chlorine Content

Chlorine contents in the catalysts indicated in Examples and Comparative Examples were measured using a coulometry-type chlorine/sulfur analyzer TOX-2100H, manufactured by DIA Instruments Co., Ltd. A sample for measurement was made by mixing 0.1 g of the prepared Pt/Pd/C core shell catalyst or Pt/C catalyst with 0.9 g of Ketjen Black EC (with a chlorine content that is not more than the detection limit). The amount of chlorine generated by combusting the sample at a combustion temperature of 900° C. under circulation of a mixture gas of Ar (200 mL/min) and $O_2$ (200 mL/min) Was measured to calculate the concentration of chlorine contained in the catalyst. The obtained chlorine concentration was listed in Table 1. It is found that the content of chlorine in the catalyst is decreased with increasing activation treatment time and the amount of chlorine in the catalyst can be reduced by the catalytic activation treatment according to the present invention.

TABLE 1

Chlorine Content in Each Catalyst

| Sample | | Treatment time/h | Chlorine Content/ppm |
|---|---|---|---|
| Example 1 | Pt/Pd/C | 7 h × 2 times | 616 |
| Example 2 | Pt/Pd/C | 7 h | 988 |
| Example 3 | Pt/Pd/C | 3 h | 1386 |
| Example 4 | Pt/Pd/C | 1 h 30 min | 1636 |
| Example 5 | Pt/Pd/C | 30 min | 4239 |
| Comparative Example 1 | Pt/Pd/C | No Treatment | 7382 |
| Comparative Example 2 | Pt/C | No Treatment | ≤Detection Limit |
| — | Carbon Black | No Treatment | ≤Detection Limit |

Production of Membrane Electrode Assembly

Membrane electrode assemblies (MEAs) used for cell evaluation were produced by a procedure described below.

Each catalyst described in Examples and Comparative Examples was mixed with alcohol so that a solid concentration is 9 wt %, followed by adding an ion exchange resin solution to have a mass ratio of 1.0 with respect to support carbon. Ultrasonic irradiation for the prepared mixture was carried out, and catalyst-supported carbon was dispersed to produce a coating liquid. The resultant coating liquid was coated on ePTEP and dried to form an electrode layer. As for the amount of supported platinum in the formed electrode layer, each Pt/Pd/C core shell catalyst (Examples 1 to 5 and Comparative Example 1) was produced so that the amount of supported platinum was 0.1 mg/cm$^2$ and the Pt/C catalyst (Comparative Example 2) was produced so that the amount of supported platinum was 0.4 mg/cm$^2$. The obtained electrode layer was disposed as a cathode electrode, PRIMEA® #5584 (amount of supported Pt of 0.1 mg/cm$^2$) was used as an anode electrode, GORE-SELECT®, 20 μm, was used as an electrolyte membrane, and heat press was carried out to produce a membrane electrode assembly by a decal method.

Electricity Generation Test

Each membrane electrode assembly disposed between two sheets of water-repellent carbon paper (CARBEL® CNW20B) was incorporated into an electricity generation cell, hydrogen (utilization rate of 77%) and air (utilization rate of 50%) were supplied at normal pressure, and an initial electricity generation test at current densities of 0.2 Acm$^{-2}$ and 0.8 Acm$^{-2}$ was conducted at a cell temperature of 80° C. A gas with a dew point of 80° C. was supplied to both of the anode and the cathode. The obtained voltage values are listed in Table 2. In comparison with the catalyst subjected to no activation treatment (Comparative Example 1), the generated voltages of the catalysts subjected to the treatment (Examples 1 to 5) are improved, and it can be found that the voltage tends to increase with prolonging activation treatment time. Furthermore, the activated core-shell catalyst exhibits performance equivalent to that of the Pt/C catalyst (Comparative Example 2) containing 4 times platinum of the core-shell catalyst, so that it can be confirmed that sufficient performance is obtained even when the amount of platinum is reduced to ¼.

TABLE 2

Initial Voltage under High Humidification Conditions

| Sample | (Treatment Time) | Voltage/V @ 0.2 A/cm² | Voltage/V @ 0.8 A/cm² |
|---|---|---|---|
| Example 1 | Pt/Pd/C (7 h + 7 h) | 0.771 | 0.662 |
| Example 2 | Pt/Pd/C (7 h) | 0.772 | 0.649 |
| Example 3 | Pt/Pd/C (3 h) | 0.741 | 0.614 |
| Example 4 | Pt/Pd/C (1.5 h) | 0.714 | 0.592 |
| Example 5 | Pt/Pd/C (0.5 h) | 0.714 | 0.596 |
| Comparative Example 1 | Pt/Pd/C (No Treatment) | 0.698 | 0.585 |
| Comparative Example 2 | Pt/C (No Treatment) | 0.777 | 0.674 |

The invention claimed is:

1. A catalyst comprising a core shell structure, wherein the catalyst comprises a halogen and has a halogen content, wherein 99% or more of a core member is coated with a shell member, the shell member comprising a first metal selected from the group consisting of platinum, cobalt, iron, nickel, ruthenium, iridium, and gold, the core member comprising a second metal selected from the group consisting of palladium, gold, iridium, nickel, iron, cobalt and ruthenium, wherein the first metal is different than the second metal; and wherein the halogen content is 5000 ppm or less.

2. The catalyst according to claim 1, wherein the catalyst is a fuel cell catalyst.

3. The catalyst according to claim 1, wherein the catalyst is produced by an electrochemical technique.

4. The catalyst according to claim 1, wherein the halogen content is reduced to 5000 ppm or less by post-treatment.

5. A method for activating a core shell catalyst, wherein the catalyst comprises a halogen and has a halogen content, the process comprising the steps of:

providing the core shell catalyst comprising a core member formed of a core-constituted element, the core member being coated with a monolayer of a shell member and having a halogen content, wherein the shell member is formed of a shell-constituting element, wherein the shell-constituting element is different than a core-constituting element;

dispersing the core shell catalyst in a dispersion solvent;

blowing a gas with a reducing ability or a mixture gas containing the gas into the dispersion solvent to separate impurities from the core shell catalyst; and removing the impurities to reduce the halogen content of the core shell catalyst to 5000 ppm or less.

6. The method according to claim 5, wherein the core shell catalyst is a fuel cell catalyst.

7. The method according to claim 5, wherein the dispersion solvent is water.

8. The method according to claim 5, wherein the gas with the reducing ability is hydrogen and/or alcohol.

9. The method according to claim 5, wherein the dispersion solvent is stirred at a temperature of 70° C. or more during the blowing.

10. The method according to claim 5, wherein the step of removing the impurities is finished within one hour after finishing the step of separating the impurities.

11. The method according to claim 5, wherein supernatant liquid containing the impurities is separated from the core shell catalyst by decantation to remove the supernatant liquid in the step of removing the impurities.

12. The method according to claim 5, wherein the core shell catalyst comprises at least one of platinum, cobalt, iron, nickel, ruthenium, iridium, and gold in a shell unit.

13. The method according to claim 5, wherein the core shell catalyst comprises at least one of palladium, gold, iridium, nickel, iron, cobalt and ruthenium in a core unit.

* * * * *